United States Patent
Kim et al.

(10) Patent No.: US 9,845,094 B2
(45) Date of Patent: Dec. 19, 2017

(54) METHOD FOR CONTROLLING LINE PRESSURE OF HYBRID VEHICLE

(71) Applicant: HYUNDAI MOTOR COMPANY, Seoul (KR)

(72) Inventors: Young Chul Kim, Gwangmyeong-si (KR); Jong Hyun Kim, Yongin-si (KR); June Ho Lee, Seoul (KR); Sang Hyun Jeong, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/223,170

(22) Filed: Jul. 29, 2016

(65) Prior Publication Data

US 2017/0259824 A1 Sep. 14, 2017

(30) Foreign Application Priority Data

Mar. 10, 2016 (KR) ........................ 10-2016-0028871

(51) Int. Cl.
*B60W 30/18* (2012.01)
*B60W 10/06* (2006.01)
(Continued)

(52) U.S. Cl.
CPC ......... *B60W 30/18009* (2013.01); *B60C 9/00* (2013.01); *B60W 10/02* (2013.01);
(Continued)

(58) Field of Classification Search
CPC ...... B60W 10/00; B60W 10/08; B60W 10/02; B60W 20/00; B60W 10/023; B60W 10/06;
(Continued)

(56) References Cited

U.S. PATENT DOCUMENTS

| 2008/0039281 A1* | 2/2008 | Okuda | B60W 30/18 |
| | | | 477/73 |
| 2010/0075798 A1* | 3/2010 | Suzuki | B60K 6/40 |
| | | | 477/5 |

(Continued)

FOREIGN PATENT DOCUMENTS

| JP | 2009-030678 A | 2/2009 |
| JP | 2013-122310 A | 6/2013 |

(Continued)

OTHER PUBLICATIONS

Korean Office Action dated Jun. 26, 2017, issued in Korean Patent Application No. 10-2016-0028871.

*Primary Examiner* — Behrang Badii
(74) *Attorney, Agent, or Firm* — McDermott Will & Emery LLP

(57) ABSTRACT

A method for controlling a line pressure of a hybrid vehicle includes applying, by a controller, a set current corresponding to a target pressure to a first solenoid valve controlling the line pressure, driving, by the controller, a second solenoid valve to open an engine clutch after the applying step, comparing, by the controller, a difference value between a real pressure of the engine clutch sensed by a pressure sensor and the target pressure with a preset pressure after the driving step, and as a result of performing the comparing step, if the difference value is equal to or greater than the preset pressure, controlling, by the controller, an increase of a revolution per minute (RPM) speed of the electric oil pump and an increase of a pressure of the first solenoid valve to be alternately generated.

8 Claims, 4 Drawing Sheets

(51) Int. Cl.
*B60W 10/02* (2006.01)
*B60C 9/00* (2006.01)
*F16H 61/12* (2010.01)
*B60K 6/40* (2007.10)
*B60K 6/48* (2007.10)
*F16H 61/00* (2006.01)
*B60K 6/20* (2007.10)
*F16D 25/06* (2006.01)
*B60W 20/00* (2016.01)
*B60K 6/00* (2006.01)
*B60K 6/547* (2007.10)
*B60W 10/00* (2006.01)

(52) U.S. Cl.
CPC ............. *B60W 10/06* (2013.01); *F16H 61/12* (2013.01); *B60K 6/00* (2013.01); *B60K 6/20* (2013.01); *B60K 6/40* (2013.01); *B60K 6/48* (2013.01); *B60K 6/547* (2013.01); *B60W 10/00* (2013.01); *B60W 20/00* (2013.01); *B60W 30/18* (2013.01); *B60W 2510/02* (2013.01); *B60W 2710/02* (2013.01); *B60W 2710/06* (2013.01); *B60Y 2300/42* (2013.01); *B60Y 2300/45* (2013.01); *F16D 25/06* (2013.01); *F16H 61/0025* (2013.01); *F16H 61/0031* (2013.01); *F16H 2061/1232* (2013.01)

(58) Field of Classification Search
CPC ...... B60W 10/30; B60W 20/40; B60W 30/18; B60W 10/04; B60W 30/1819; B60W 30/18009; B60K 6/547; B60K 6/20; B60K 6/00; B60K 6/40; B60K 6/48; F16D 25/06; F16D 48/04; F16D 25/087; F16H 61/0031; F16H 61/0025; B60Q 9/00
See application file for complete search history.

(56) References Cited

U.S. PATENT DOCUMENTS

2012/0103709 A1* 5/2012 Mochiyama ........ F16H 61/0031
180/65.21
2012/0199437 A1* 8/2012 Okuda ..................... B60K 6/48
192/85.63

FOREIGN PATENT DOCUMENTS

| KR | 10-1995-0033194 A | 12/1995 |
| KR | 10-2008-0054406 A | 6/2008 |
| KR | 10-2014-0059613 A | 5/2014 |

* cited by examiner

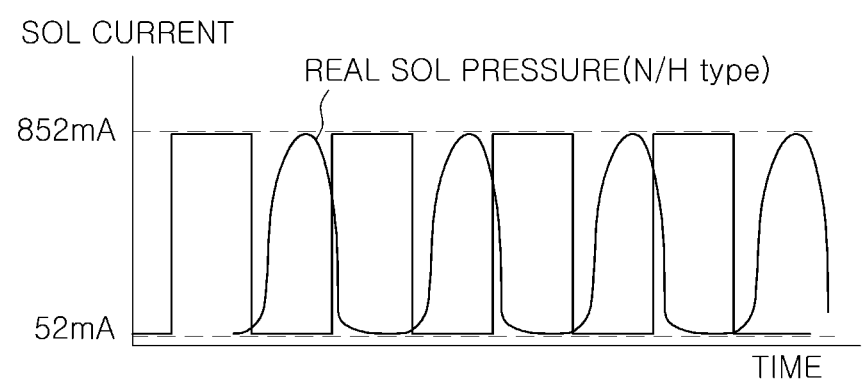

METHOD FOR CONTROLLING LINE PRESSURE OF HYBRID VEHICLE

CROSS REFERENCE TO RELATED APPLICATION

The present application claims the benefit of priority to Korean Patent Application No. 10-2016-0028871, filed on Mar. 10, 2016 with the Korean Intellectual Property Office, the entire contents of which is incorporated herein for all purposes by this reference.

TECHNICAL FIELD

The present disclosure relates to a method for controlling a line pressure of a hybrid vehicle during very low temperatures.

BACKGROUND

Generally, a viscosity of an automotive transmission fluid is about 200 times higher at a very low temperature of −35 to −25° C. than a corresponding viscosity at a normal temperature. As a result, a valve sliding resistance force of a valve body controlling an oil pressure may be very large and a rough operation of a valve may occur due to micro residual burrs, scratches, or the like at a bore of the valve body that does not occur at the normal temperature.

In particular, due to a decrease in a line pressure or a non-generation of a pressure upon sliding of a regulator valve controlling the line pressure, a transmission clutch or a transmission brake may not be supplied with an adequate oil pressure. In this case, a hybrid vehicle has a problem in that a motor speed may diverge or the engine and the motor may not be combined with each other upon an initial launch of the hybrid vehicle.

The present disclosure relates to a control method for solving an adverse line pressure situation of a hybrid vehicle at a time of the very low temperature by controlling an electric oil pump (EOP) and a solenoid valve, when the adequate line pressure may not be generated.

The contents described as the related art have been provided only for assisting in the understanding of the background of the present disclosure and should not be considered as corresponding to the related art known to those skilled in the art.

SUMMARY

An object of the present disclosure is to provide a method for controlling a line pressure of a hybrid vehicle capable of solving line pressure adverse operations by sensing a situation where the line pressure of the hybrid vehicle may not be controlled at the time of a very low temperature and controlling an electric oil pump and a first solenoid valve.

According to an exemplary embodiment of the present disclosure, there is provided a method for controlling a line pressure of a hybrid vehicle, that may include: applying, by a controller, a set current corresponding to a target pressure to a first solenoid valve controlling a line pressure; driving, by the controller, a second solenoid valve to open an engine clutch after the applying step; comparing, by the controller, a difference value between a real pressure of the engine clutch sensed by a pressure sensor and the target pressure with a preset pressure after the driving step; and as a result of performing the comparing step, if the difference value is equal to or greater than the preset pressure, controlling, by the controller, an increase of revolution per minute (RPM) speed of the electric oil pump and an increase of pressure of the first solenoid valve to be alternately generated.

The method may further include: prior to the applying step, if the vehicle is started, or enters an ignition on state, (IG ON) to operate the electric oil pump at a minimum value, sensing, by the controller, a range position of a shift lever; and as a result of performing the sensing step, if the range position of the shift lever is a P range or an N range, turning off, by the controller, an engine, in which the controller performs the applying step after the turning off step.

After the controlling step, the controller may perform the sensing step again.

The controlling step may include: confirming, by the controller, whether the difference value is equal to or greater than than a preset pressure for a set time; as a result of performing the confirming step, if the difference value is maintained at the preset pressure for the set time, counting, by the controller, an operation frequency to determine whether the operation frequency is less than a set frequency; and as a result of performing the determining step, if it is determined that the operation frequency is less than the set frequency, controlling, by the controller, the RPM of the electric oil pump and the pressure of the first solenoid valve to alternately rise.

As a result of performing the determining step, if it is determined that the operation frequency is equal to or greater than the set frequency, the controller may turn on a warning light.

As a result of performing the determining step, if it is determined that the operation frequency is equal to or greater than a set frequency, the controller may control the vehicle in a fail safe mode.

The first solenoid valve may be a normal-high type valve and the second solenoid valve may be a normal-low type valve.

In the controlling step, the controller may apply a current of a minimum value to the first solenoid valve to allow a pressure of the first solenoid valve to rise.

BRIEF DESCRIPTION OF THE DRAWINGS

FIGS. 4A and 4B are graphs illustrating an operation of an electric oil pump and a first solenoid valve in a control step according to an exemplary embodiment of the present disclosure.

DETAILED DESCRIPTION

Hereinafter, a method for controlling a line pressure of a hybrid vehicle according to an exemplary embodiment of the present disclosure will be described with reference to the accompanying drawings.

Figure 1:
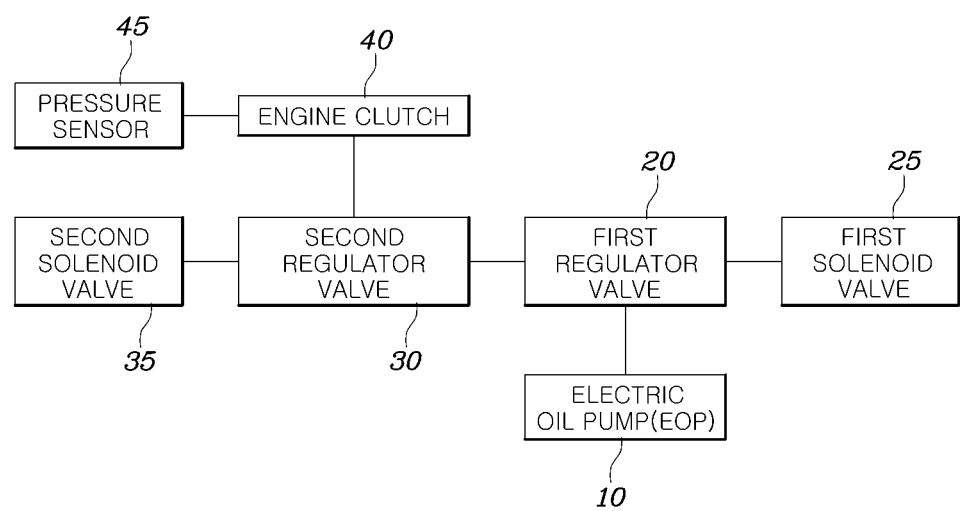
FIG. 1 is a schematic diagram illustrating an apparatus for controlling a line pressure of a hybrid vehicle according to an exemplary embodiment of the present disclosure.

First, an apparatus for performing a method for controlling a line pressure of a hybrid vehicle will be described. FIG. 1 is a schematic diagram illustrating an apparatus for controlling a line pressure of a hybrid vehicle according to an exemplary embodiment of the present disclosure. Referring to FIG. 1, the apparatus for controlling a line pressure of a hybrid vehicle may include a first regulator valve 20 connected to an electric oil pump (EOP) 10, a first solenoid valve 25 connected to the first regulator valve 20 to control a line pressure, a second regulator valve 30 installed between the first regulator valve 20 and an engine clutch 40 to provide the line pressure to the engine clutch 40, a second solenoid valve 35 for controlling the line pressure of the second regulator valve 30, and a pressure sensor 45 for sensing a pressure of the engine clutch 40.

The components as described above may be comprehensively controlled by one controller or may each be controlled by one or more of a plurality of controllers. The present disclosure describes that the respective components as described above may be controlled by one controller for ease of description, which may be variably applied according to various vehicle models. Therefore, the present disclosure is not limited thereto.

Figure 2:
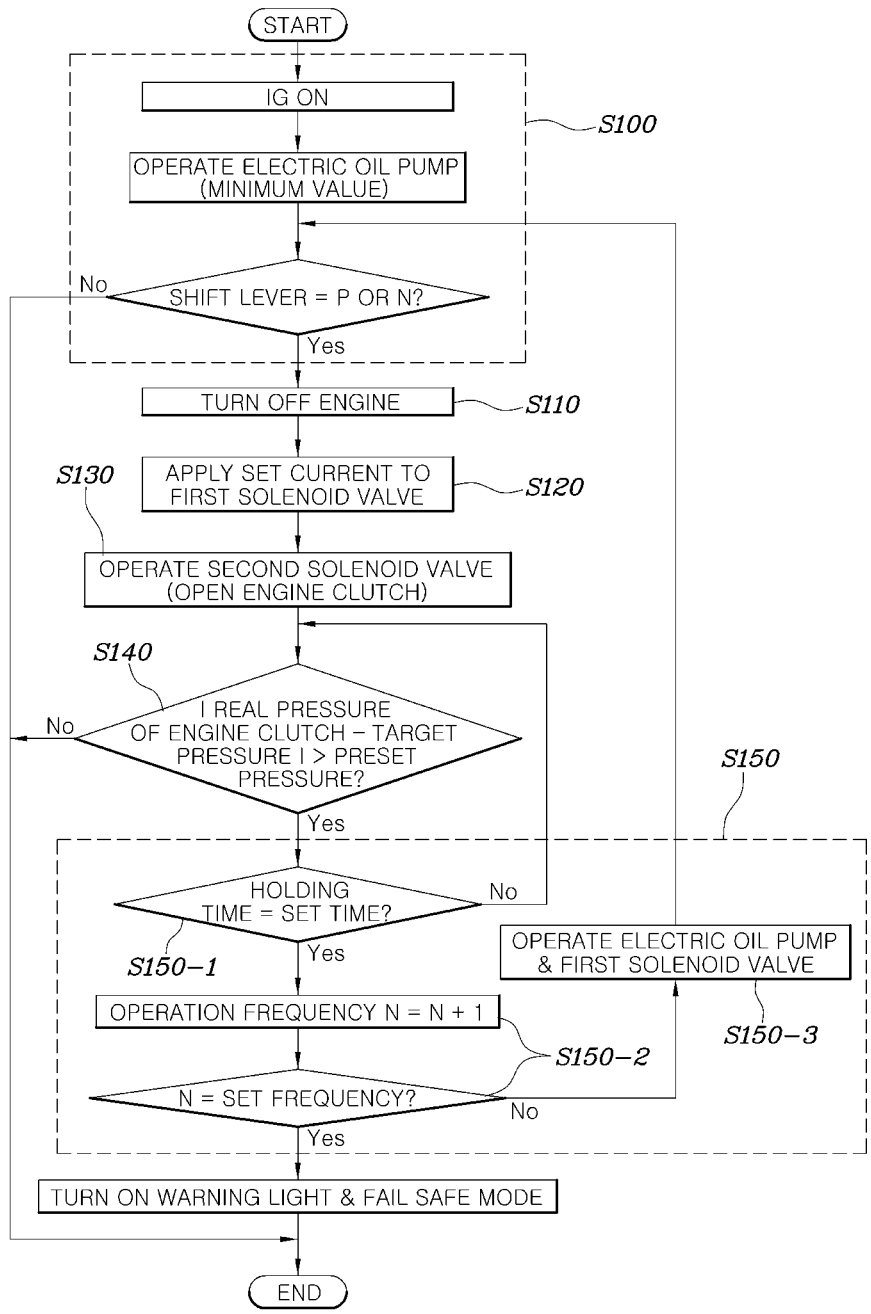
FIG. 2 is a flow chart illustrating a method for controlling a line pressure of a hybrid vehicle according to an exemplary embodiment of the present disclosure.

FIG. 2 is a flowchart illustrating a method for controlling a line pressure of a hybrid vehicle according to an exemplary embodiment of the present disclosure. Referring to FIG. 2, an method for controlling a line pressure of a hybrid vehicle may include: applying, by a controller, a set current corresponding to a target pressure to a first solenoid valve 25 controlling a line pressure (S120); driving, by the controller, a second solenoid valve 35 to open an engine clutch 40 after the applying step (S120) (S130); comparing, by the controller, a difference value, or an absolute value, between a real pressure of the engine clutch 40 sensed by a pressure sensor 45 and a target pressure with a preset pressure after the driving step (S130) (S140); and as a result of performing the comparing step (S140), if the difference value, or absolute value, is equal to or more than the preset pressure, controlling, by the controller, an increase of RPM speed of the electric oil pump 10 and an increase of pressure of the first solenoid valve 25 to be alternately generated (S150), or both may be generated.

That is, the controller may calculate a current value to be applied to the first solenoid valve 25 to form the line pressure using pre-stored map data. Therefore, the set current that is the current value set to form the line pressure of the first regulator valve 20 to be the target pressure may be applied to the first solenoid valve 25 to control the line pressure to reach the target pressure.

However, when the hybrid vehicle is in a very low temperature state, a viscosity of an automotive transmission fluid may increase and thus the real line pressure may not reach the target pressure. Therefore, the controller may continuously perform the driving step (S130) as described above to determine whether the line pressure reaches the target pressure.

In detail, the controller may operate the second solenoid valve 35 of the second regulator valve 30 connected to the engine clutch 40 to primarily open the engine clutch 40 (S130). Then, it may be determined whether the line pressure is normal by comparing the difference value, or absolute value, between a real pressure of the engine clutch 40 sensed by the pressure sensor 45 and a target pressure with the preset pressure (S140).

For example, if the line pressure of the first regulator valve 20 is normally the target pressure, or is normal and is thus the target pressure, the difference value may be smaller than the preset pressure, and therefore there may be no need to perform the control for separately forming the line pressure. On the contrary, if the first regulator valve 20 is not normally operated and therefore the line pressure may not be the target pressure, the difference value may be sensed as being larger than the preset pressure, and the controlling step (S150) may be performed to normally operate the first regulator valve 20.

In the controlling step (S150), the controller may perform a control to alternately generate an increase of an RPM speed of the electric oil pump 10 and an increase of a pressure of the first solenoid valve 25, thereby reducing a rough feeling, or a rough operation, of the first regulator valve 20.

Figure 3:
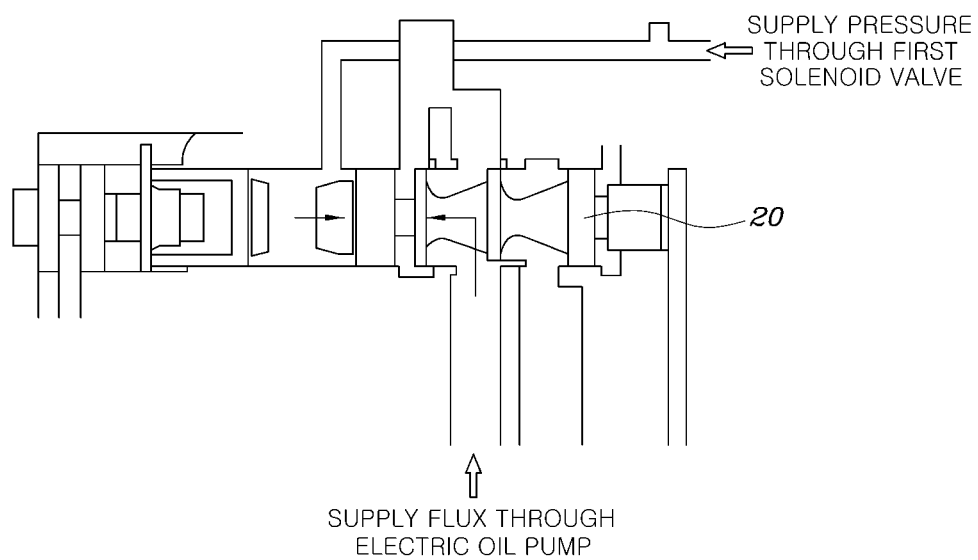
FIG. 3 is a diagram illustrating an operation of a first regulator valve in a control step according to an exemplary embodiment of the present disclosure.

FIG. 3 is a diagram illustrating an operation of the first regulator valve in a controlling process according to an exemplary embodiment of the present disclosure. Referring to FIG. 3, when a vehicle is in a very low temperature state, a viscosity of the automotive transmission fluid may be large, and therefore the first regulator valve 20 may not normally move due to a resistance force, such that the line pressure may not be formed even by the control of the first solenoid valve 25. Therefore, the supply of flux through the electric oil pump (EOP) and the supply of pressure through the first solenoid valve 25 may be alternately generated so that the first regulator valve 20 may alternately receive force horizontally.

Figure 4A:
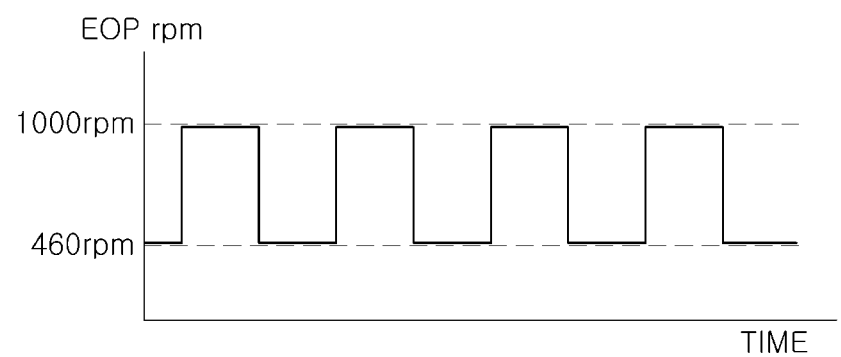

For example, FIGS. 4A and 4B are graphs illustrating an operation of the electric oil pump and the first solenoid valve in a controlling process according to an exemplary embodiment of the present disclosure. Referring to FIGS. 4A and 4B, to horizontally move the first regulator valve, the controller may alternately control the RPM of the electric oil pump (EOP) to rise from 460 RPM that may be a minimum value to 1000 RPM as illustrated in FIG. 4A, and a driving current of the first solenoid valve to rise from 52 mA to 852 mA as illustrated in FIG. 4B. In this case, the first solenoid valve may be set as a normal-high type and therefore the real rising of pressure of the first solenoid valve will be generated when the driving current is low.

Therefore, the controller may control timings when the first solenoid valve and the electric oil pump are each controlled to be a maximum value to be simultaneously generated. The value of the RPM of the electric oil pump and the value of the driving current of the first solenoid valve as described above are merely values according to an exemplary embodiment of the present disclosure, and therefore may be changed according to various vehicle models. As a result, the values will not be limited thereto.

Therefore, when the hybrid vehicle does not normally form the line pressure under a very low temperature, the electric oil pump and the first solenoid valve may be controlled to horizontally move the first regulator valve to reduce the rough feeling, or the rough operation, of the first regulator valve, thereby solving the situation where the line pressure may not be adequately controlled.

Referring back to FIG. 2, according to an exemplary embodiment of the present disclosure, a method for controlling a line pressure of a hybrid vehicle may further include: prior to the applying step (S120), if the vehicle is in an ignition on state (IG ON) to operate the electric oil pump 10 at a minimum value, sensing, by the controller, a range position of a shift lever (S100); and as a result of performing the sensing step (S100), if the range position of the shift lever is a P range or an N range, turning off, by the controller, an engine (S110), in which the controller performs the applying step (S120) after the turning off step (S110).

That is, the controller may determine whether the vehicle stops under the situation that the vehicle starts and may turn off the engine to sense the line pressure condition and solve a line pressure problem only when the vehicle stops. If the range position of the shift lever is a D range or an R range, the vehicle is driving and therefore the control may directly end. Therefore, it is possible to secure drivability of a driver by preventing the engine from being turned off while the vehicle drives.

Meanwhile, after the controlling step (S150), the controller may perform the sensing step (S100) again. That is, the controller may perform a control to drive the electric oil pump 10 and the first solenoid valve 25 to reduce the rough feeling, or the adverse operation, of the first regulator valve 20 and then may perform the applying step (S100) again to determine whether the line pressure is normal, or adequate.

Further, the controlling step (S150) may include: confirming, by the controller, whether the difference value is equal to or greater than a preset pressure for a set time (S150-1); as a result of performing the confirming step (S150-1), if the difference value is maintained at the preset pressure for the set time, counting, by the controller, an operation frequency to determine whether the operation frequency is less than a set frequency (S150-2); and as a result of performing the determining step (S150-2), if it is determined that the operation frequency is less than the set frequency, controlling, by the controller, the RPM speed of the electric oil pump 10 and the pressure of the first solenoid valve 25 to alternately increase (S150-3).

That is, if the difference value between a real pressure of the engine clutch 40 and a target pressure is larger than the set pressure, the controller may compare a time when the corresponding state is maintained with a set time to determine whether the difference between the real pressure and the target pressure is temporary (S150-1). If it is determined that the difference value is equal to or greater than the preset pressure for the set time, the operation frequency may be counted to count the frequency at which the control to reduce the rough feeling, or the adverse operation, of the first regulator valve 20 may be performed and the control may be limited to be less than the set frequency, thereby determining the situation that the line pressure may not be controlled (S150-2).

If it is determined that the operation frequency is less than the set frequency, the first regulator valve 20 alternately may move horizontally to control the electric oil pump 10 and the first solenoid valve 25 to reduce the rough feeling, or adverse operation, due to the very low temperature, thereby normally forming the line pressure (S150-3).

On the contrary, as a result of performing the determining step (S150-2), if it is determined that the operation frequency is equal to or greater than the set frequency, the controller may turn on a warning light or control the vehicle in a fail-safe mode.

That is, if the controller does not perform the controlling step (S150) at the set frequency or more and thus the rough feeling, or adverse operation, of the first regulator valve 20 may not be solved, in order to inform a driver of a precise diagnosis and repair, the controller may turn on the warning light of a cluster for a vehicle or set a driving mode in a fail-safe mode to prevent a secondary vehicle fault.

The first solenoid valve 25 may be a normal-high type valve and the second solenoid valve 35 may be a normal-low type valve. That is, in the controlling step (S150), the controller may apply a current of a minimum value to the first solenoid valve 25 to increase the pressure of the first solenoid valve 25.

Therefore, the controller may be installed to allow a signal controlling the RPM of the electric oil pump 10 and a current signal applied to the first solenoid valve 25 to simultaneously rise/drop as illustrated in FIGS. 4A and 4B, thereby actually controlling the timing when the RPM of the electric oil pump 10 rises and the timing when the pressure of the first solenoid valve 25 rises to be alternately generated. According to a method for controlling a line pressure of a hybrid vehicle having the structure as described above, it is possible to improve the marketability and stability of the vehicle by sensing and preventing the line pressure control situation, or adverse situation, of the hybrid vehicle at a time of a very low temperature and to reduce the occurrence of the vehicle problem.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A method for controlling a line pressure of a hybrid vehicle, comprising:
   applying, by a controller, a set current corresponding to a target pressure to a first solenoid valve controlling the line pressure;
   driving, by the controller, a second solenoid valve to open an engine clutch after the applying step;
   comparing, by the controller, a difference value between a real pressure of the engine clutch sensed by a pressure sensor and the target pressure with a preset pressure after the driving step; and
   as a result of performing the comparing step, if the difference value is equal to or greater than the preset pressure, controlling, by the controller, an increase of a revolution per minute (RPM) speed of the electric oil pump and an increase of a pressure of the first solenoid valve to be alternately generated.

2. The method of claim 1, further comprising:
   prior to the applying step, if the vehicle is started to operate the electric oil pump at a minimum value, sensing, by the controller, a range position of a shift lever; and
   as a result of performing the sensing step, if the range position of the shift lever is a P range or an N range, turning off, by the controller, an engine,
   wherein the controller performs the applying step after the turning off step.

3. The method of claim 2, wherein after the controlling step, the controller performs the sensing step again.

4. The method of claim 1, wherein the controlling step includes:
   confirming, by the controller, whether the difference value is equal to or greater than the preset pressure for a set time;
   as a result of performing the confirming step, if the difference value is maintained at the preset pressure for the set time, counting, by the controller, an operation frequency to determine whether the operation frequency is less than a set frequency; and
   as a result of performing the determining step, if it is determined that the operation frequency is less than the set frequency, controlling, by the controller, the RPM of the electric oil pump and the pressure of the first solenoid valve to alternately rise.

5. The method of claim 4, wherein as a result of performing the determining step, if it is determined that the operation frequency is equal to or greater than the set frequency, the controller turns on a warning light.

6. The method of claim 4, wherein as a result of performing the determining step, if it is determined that the operation frequency is equal to or greater than the set frequency, the controller controls the vehicle in a fail safe mode.

7. The method of claim 1, wherein the first solenoid valve is a normal-high type valve and the second solenoid valve is a normal-low type valve.

8. The method of claim 7, wherein in the controlling step, the controller applies a current of a minimum value to the first solenoid valve to allow the pressure of the first solenoid valve to rise.

* * * * *